US012790164B2

(12) United States Patent
Li et al.

(10) Patent No.: US 12,790,164 B2
(45) Date of Patent: Nov. 10, 2026

(54) BRAKE, METHOD FOR DETERMINING ITS STATE, TRACTION MACHINE AND ELEVATOR SYSTEM

(71) Applicant: Otis Elevator Company, Farmington, CT (US)

(72) Inventors: Guosong Li, Tianjin (CN); Hua Zhou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1400 days.

(21) Appl. No.: 17/523,986

(22) Filed: Nov. 11, 2021

(65) Prior Publication Data

US 2022/0281713 A1 Sep. 8, 2022

(30) Foreign Application Priority Data

Mar. 8, 2021 (CN) ........................ 202110251022.5

(51) Int. Cl.

| | |
|---|---|
| ***B66B 1/32*** | (2006.01) |
| ***B66B 5/20*** | (2006.01) |
| ***H01F 7/126*** | (2006.01) |
| ***H01F 7/127*** | (2006.01) |

(52) U.S. Cl.

CPC .................. *B66B 1/32* (2013.01); *B66B 5/20* (2013.01); *H01F 7/126* (2013.01); *H01F 7/127* (2013.01)

(58) Field of Classification Search

CPC .... B66B 1/32; B66B 5/16; B66B 5/20; B66B 5/0068; H01F 7/126; H01F 7/127

See application file for complete search history.

(56) References Cited

U.S. PATENT DOCUMENTS

2006/0151254 A1* 7/2006 Sevilleja-Perez ........ B66D 5/30 187/351
2017/0349406 A1 12/2017 Illan

FOREIGN PATENT DOCUMENTS

| | | | | |
|---|---|---|---|---|
| CN | 203903709 U | * 10/2014 | | |
| CN | 102341332 B | * 5/2015 | .............. | B66B 1/32 |
| CN | 105110116 A | 12/2015 | | |
| CN | 103596870 B | * 11/2016 | | |
| CN | 218145210 U | * 12/2022 | | |

(Continued)

OTHER PUBLICATIONS

European Search Report for Application No. 21213823.4, Issued Jun. 21, 2022, 8 Pages.

(Continued)

*Primary Examiner* — Eduardo Colon Santana
(74) *Attorney, Agent, or Firm* — CANTOR COLBURN LLP

(57) ABSTRACT

A brake, a method for judging its state, a traction machine, and an elevator system. The traction machine and the elevator system include the brake. The brake includes a moving plate, and a fixed element having a fixed position relative to a base of the brake, and the brake further includes a first solenoid coil and a first ferromagnetic body; the first solenoid coil is disposed on one of the moving plate and the fixed element, the first ferromagnetic body is disposed on the other of the moving plate and the fixed element, a relative position of the first solenoid coil and the first ferromagnetic body is set such that the inductance of the first solenoid coil can change with the distance between the moving plate and the fixed element.

13 Claims, 3 Drawing Sheets

(56) References Cited

FOREIGN PATENT DOCUMENTS

| | | | | | |
|---|---|---|---|---|---|
| EP | 3567000 | A1 * | 11/2019 | ............. | F16D 59/02 |
| EP | 4008670 | A1 * | 6/2022 | ............... | B66B 5/18 |
| WO | 2018092322 | A1 | 12/2015 | | |

OTHER PUBLICATIONS

European Search Report for Application No. 21213823.4, Issued Dec. 3, 2024, 6 Pages.

* cited by examiner

BRAKE, METHOD FOR DETERMINING ITS STATE, TRACTION MACHINE AND ELEVATOR SYSTEM

FOREIGN PRIORITY

This application claims priority to Chinese Patent Application No. 202110251022.5, filed Mar. 8, 2021, and all the benefits accruing therefrom under 35 U.S.C. § 119, the contents of which in its entirety are herein incorporated by reference.

TECHNICAL FIELD

The present disclosure relates to the technical field of elevators; specifically, the present disclosure relates to a traction machine brake, and further relates to a method for judging its state, a traction machine including the traction machine brake, and an elevator system including the traction machine brake.

BACKGROUND

With the development of society, there are more and more multi-storey and even high-rise buildings arising in either living areas or in commercial and production areas. Elevator systems are usually installed in these buildings to transport people or goods between floors or platforms of different heights.

A traction machine is the power equipment of the elevator, and its function is to transfer and transmit power to make the elevator run. A traction machine brake is an electromechanical device that prevents the elevator from moving again when an elevator car is static and the traction machine is in a power-off state. In some control methods, the elevator is braked when the traction machine is powered off. For brakes in the prior art, the state of the brake is detected by a mechanical microswitch.

SUMMARY

An object of an aspect of the present disclosure is to provide an improved traction machine brake.

An object of another aspect of the present disclosure is to provide an improved method for judging the state of a brake.

An object of further another aspect of the present disclosure is to provide an improved traction machine.

An object of still further another aspect of the present disclosure is to provide an improved elevator system.

In order to achieve the above objects, an aspect of the present disclosure provides a traction machine brake, wherein the brake includes a moving plate, and a fixed element having a fixed position relative to a base of the brake, and the brake further includes a first solenoid coil and a first ferromagnetic body, wherein the first solenoid coil is disposed on one of the moving plate and the fixed element, the first ferromagnetic body is disposed on the other of the moving plate and the fixed element, a relative position of the first solenoid coil and the first ferromagnetic body is set such that the inductance of the first solenoid coil can change with the distance between the moving plate and the fixed element.

Optionally, in the brake described above, the brake further includes a detection and control circuit which has a detection element and a controller, and the controller determines a locked or unlocked state of the brake based on an output current and/or inductance of the first solenoid coil detected by the detection element.

Optionally, in the brake described above, the first solenoid coil is formed on a bracket or a pillar extending from the fixed element.

Optionally, in the brake described above, the fixed element is the base of the brake or is integrally formed with the base.

Optionally, in the brake described above, the fixed element is a static plate of the brake.

Optionally, in the brake described above, the brake further includes a friction plate for braking the traction machine, the static plate and the friction plate are spaced apart, and the static plate has a second solenoid coil, the moving plate is located between the friction plate and the static plate, wherein when the brake is locked, the moving plate moves toward the friction plate under the action of a resetting force and causes the friction plate to brake the traction machine, and when the brake is unlocked, the moving plate overcomes the resetting force under the action of an electromagnetic force of the second solenoid coil and moves toward the static plate.

Optionally, in the brake described above, the position where the first solenoid coil is disposed avoids a magnetic circuit of the second solenoid coil.

Optionally, in the brake described above, the first solenoid coil is disposed on an outer peripheral side of the static plate; or the first solenoid coil is disposed at the center of the static plate; or the first solenoid coil is embedded in the static plate.

Optionally, in the brake described above, the static plate and the friction plate are spaced apart in a radial direction of an output shaft of the traction machine.

Optionally, in the brake described above, the static plate and the friction plate are spaced apart in an axial direction of an output shaft of the traction machine.

Optionally, in the brake described above, the position of the first solenoid coil coincides with a functional element at the static plate in an axial direction of the static plate.

Optionally, in the brake described above, the functional element is at least one of an encoder, a resetting device that generates the resetting force, a guide sleeve, a washer, and a screw.

In order to achieve the above objects, another aspect of the present disclosure provides a method for judging the state of the brake according to any one of the above aspects, wherein the method includes the following steps: measuring a current and/or inductance of the first solenoid coil; and determining the state of the brake based on a change in the measured current and/or inductance.

In order to achieve the above objects, further another aspect of the present disclosure provides a traction machine, wherein the traction machine includes the brake as described in any one of the above items.

In order to achieve the above objects, still further another aspect of the present disclosure provides an elevator system, wherein the elevator system includes the traction machine as described in any one of the above items.

BRIEF DESCRIPTION OF THE DRAWINGS

With reference to the accompanying drawings, the content of the present disclosure will be more apparent. It should be understood that these drawings are provided only for illustrative purpose, and are not intended to limit the scope of protection of the present disclosure. In the drawings.

DETAILED DESCRIPTION OF EMBODIMENT(S)

Figure 1:
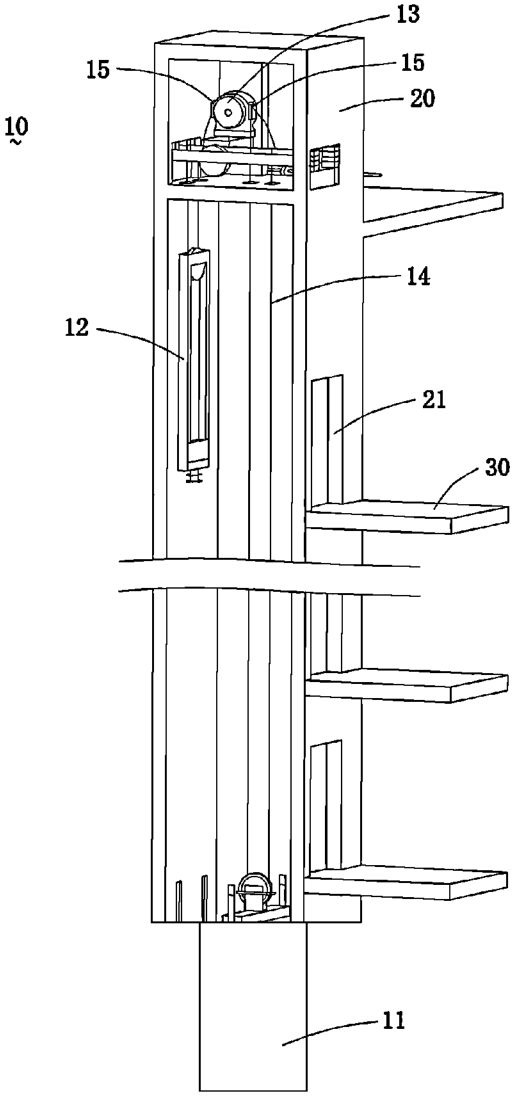
FIG. 1 schematically shows an elevator system having a traction machine.

Specific embodiments of the present disclosure will be described in detail below with reference to the drawings. In the drawings, identical or corresponding technical features are denoted by identical reference numerals.

For brevity and illustrative purpose, the principles of the present disclosure are described in this specification with reference to the examples shown in the drawings. However, it should be understood by those skilled in the art that the same principles may be applied to various types of traction machine brakes of elevator systems, and these same principles can be implemented therein. Any such application does not depart from the concept and scope of the present disclosure.

Terms "first", "second" or similar expressions mentioned in this specification are only used for naming, describing or distinguishing purposes, and cannot be understood as indicating or implying the relative importance of the corresponding members, nor do they necessarily limit the number of corresponding members.

Although the solutions and features in this application are disclosed in combination with only one or more of several embodiments/examples, as may be desirable and/or advantageous for any given or identifiable function, this feature can be combined with one or more other features of other embodiments/examples. Therefore, the following description should not be regarded as limiting the scope of this application.

FIG. 1 schematically shows an elevator system having a traction machine. The elevator system may be configured to transport people or goods between different floors of a building in living areas, commercial areas, production areas and the like.

As can be seen from the figure, the elevator system 10 includes an elevator car 11, a counterweight 12, and a traction machine 13. The traction machine 13 is located in a top machine room of an elevator hoistway 20, provides power, and connects to and drives the car 11 and the counterweight 12 through a traction rope 14 so that the elevator system can operate normally.

A traction machine brake 15 locks the traction machine 13 when the elevator needs to be stopped, stops the operation of the elevator, and prevents the elevator car 11 from moving again. Specifically, when a power source of the elevator is working normally and the brake is unlocked, the traction machine 13 can drive the car 11 and the counterweight 12 to run; and when the power source of the elevator fails or the brake is locked, the brake 15 stops the operation of the traction machine 13.

The figure also shows the elevator hoistway 20, individual floors 30 and elevator doors 21 at individual floors.

FIG. 1 also shows moving plates on both sides of the brake 15. When the brake needs to be locked, the moving plates move toward a friction plate (not shown), so that the friction plate locks a traction machine wheel, thereby stopping the operation of the elevator. It can be understood that the brake here may also include a static plate, and the moving plates shown in the figure move between the friction plate and the static plate under the action of an electromagnetic force. When the brake needs to be locked, the moving plates are pushed toward the friction plate under the action of a spring force, and the friction plate locks the traction machine wheel; and when the brake needs to be unlocked, the moving plates overcome the spring force and move toward the static plate under the action of the electromagnetic force, thereby disengaging from the friction plate and releasing the locking of the traction machine wheel.

It can be seen that in the example shown in FIG. 1, the brake locks the traction machine wheel in a radial direction.

Figure 2:
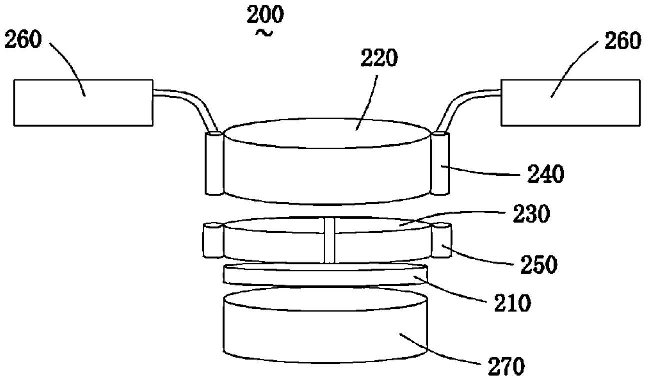
FIG. 2 shows a schematic view of an embodiment of a traction machine brake according to the present disclosure.

FIG. 2 shows a schematic view of an embodiment of the traction machine brake according to the present disclosure. The brake in FIG. 2 is different from the brake in FIG. 1 in that the moving plate is adapted to move between the static plate and the friction plate in an axial direction of the traction machine.

As shown in the figure, the brake 200 may include a friction plate 210, a static plate 220, a moving plate 230, a first solenoid coil 240, a first ferromagnetic body 250, a detection and control circuit 260, and the like. The figure also shows a base 270 of the brake 200. It should be noted herein that in modified embodiments, the friction plate 210, the static plate 220, the moving plate 230, etc., may also take other forms such as non-sheet shape and/or non-plate shape, which will also fall within the scope of the present disclosure.

The friction plate 210 is configured to brake the traction machine. In an alternative embodiment, the friction plate 210 may be connected to a traction machine shaft through a spline or the like, so as to rotate with the traction machine shaft. When the friction plate 210 is compressed by the moving plate 230 and moves toward the base 270 to abut against the base 270, it will stop rotating due to the friction between it and the base 270, and will cause the traction machine shaft of the traction machine 200 to stop rotating. Generally, the compressing that moves the friction plate 210 toward the base 270 is applied when the moving plate 230 is driven by a spring force of a spring (not shown) provided on the static plate 220. After the friction plate 210 moves away from the base 270, the friction plate 210 is in a free state and can freely rotate with the traction machine shaft to release the braking of the traction machine shaft.

The static plate 220 has a fixed position relative to the base 270 of the brake 200. The static plate 220 and the friction plate 210 are spaced apart, and a moving space for the moving plate 230 is provided between the static plate 220 and the friction plate 210. The gap is very small. The static plate 220 may have a second solenoid coil 221 (see FIG. 3). The second solenoid coil 221 is configured to provide an electromagnetic force for attracting the moving plate 230 when unlocking the brake 200, so that the moving plate 230 can overcome the spring force and move toward the static plate 220 and away from the friction plate 210, thus enabling the friction plate 210 to leave the base 270 and unlocking the brake 200. When the second solenoid coil 221 is de-energized to stop providing the electromagnetic force, the moving plate 230 pushes the friction plate 210 under the action of the spring force so that the friction plate 210 rubs against the base 270 and the traction machine shaft is locked.

The moving plate 230 is located between the friction plate 210 and the static plate 220, and the three are arranged in the axial direction of the traction machine shaft. As described above, when the brake 200 is locked, the moving plate 230 moves toward the friction plate 210 under the action of the spring force and causes the friction plate 210 to brake the traction machine. When unlocking the brake 200, the moving plate 230 overcomes the resetting force under the action of the electromagnetic force of the second solenoid coil 221 and moves toward the static plate 220. It can be understood that according to specific circumstances, other resetting devices may be used here to replace the spring, so that other forms of resetting force may be used to replace the spring force.

A first solenoid coil 240 is disposed on the static plate 220, and the position where the first solenoid coil 240 is disposed on the static plate 220 avoids a magnetic circuit of the electromagnetic force of the second solenoid coil 221. The first solenoid coil 240 arranged in this way does not affect the original magnetic circuit of the second solenoid coil 221 and does not interfere with the original movement of the moving plate 230 attracted by the second solenoid coil through the electromagnetic force. In one manufacturing method, the first solenoid coil may be formed on a bracket or pillar (not shown) extending from the static plate. The bracket or pillar may be fixed on the static plate 220 by welding, bonding or other methods, or may be integrally formed on the static plate 220 directly during molding. Such a manufacturing method has the advantages of facilitating processing and saving cost.

According to the illustrated example, the first solenoid coil 240 may be provided on an outer peripheral side of the static plate 220. On the outer peripheral side, the first solenoid coil 240 does not interfere with the original magnetic field of the second solenoid coil 221. As shown in FIG. 2. In this example, a total of two first solenoid coils 240 are provided, and the two first solenoid coils 240 are oppositely distributed on both sides of the static plate 220.

In different embodiments, one or another different number of first solenoid coils and first ferromagnets having the corresponding number and positions to first solenoid coils may also be provided. Each first solenoid coil may be connected to an independent detection and control circuit to detect current and/or obtain inductance and judge the state of the brake. In a case where there is only one pair of the first solenoid coil and the first ferromagnetic body, for example, once the first solenoid coil fails and the normal current cannot be detected or the inductance cannot be obtained, the system reports an error and reminds the maintenance personnel to perform maintenance.

In an alternative embodiment, the first solenoid coil may be disposed at the center of the static plate. In some traction machine brakes of elevators, an encoder is disposed at the center of the static plate; considering that the magnetic circuit of the second solenoid coil can also be avoided at the center position, so in this case, some space may also expand around the center of the static plate, and the first solenoid coil is disposed at the encoder so that the position of the first solenoid coil coincides with the encoder of the brake in the axial direction of the static plate. Alternatively, the encoder may also be placed on the other side of the traction machine, thereby vacating the center of the static plate to install the first solenoid coil.

In an alternative embodiment, the position of the first solenoid coil coincides with the resetting device that generates the resetting force in the axial direction of the static plate. The resetting device is configured to reset the moving plate to the position for locking the brake when the second solenoid coil does not apply the electromagnetic force. For example, the resetting device may be a spring, and the resetting force may be a spring force. As mentioned above, a further space may expand around the position where the resetting spring is installed on the static plate so as to install the first solenoid coil.

In a further alternative embodiment, the first solenoid coil may be embedded in the static plate. For example, the first solenoid coil may be disposed at positions corresponding to the functional elements such as a washer, a guide sleeve and the spring at the static plate. The washer here may be, for example, but is not limited to, an O-ring, and is for example made of rubber material and the like without being limited thereto. These elements provide different functions at the static plate, and there is no magnetic circuit passing through their positions, so expanding an appropriate space at the positions of these elements for installing the first solenoid coil may also be considered.

Based on the above, it can be seen that in order to achieve an effective electromagnetic induction effect, the number and positions of the first ferromagnetic bodies may be set to correspond to the first solenoid coils. For example, the first ferromagnetic body may directly face the first solenoid coil. When the moving plate moves toward the static plate, the first ferromagnetic body approaches the first solenoid coil linearly while directly facing it, which can make the current passing through the first solenoid coil or the inductance of the first solenoid coil change rapidly and obviously, so as to facilitate measuring a change in the current and/or the inductance to determine the state of the brake.

As shown in the figure, the first ferromagnetic body 250 may be provided on the moving plate 230. A relative position of the first ferromagnetic body 250 and the first solenoid coil 240 is set such that the inductance of the first solenoid coil 240 changes with the distance between the moving plate 230 and the static plate 220. It can be seen that in addition to the case where the first ferromagnetic body is disposed directly facing the first solenoid coil described above, according to specific situations, the locked and unlocked state of the brake can be judged accordingly even if the first ferromagnetic body is slightly deflected from the first solenoid coil, as long as the current passing through the first solenoid coil and the inductance of the first solenoid coil can change with the distance between the moving plate and the static plate and the detection and control circuit can measure such a change.

The detection and control circuit 260 may have a detection element and a controller. The detection element may be configured to measure the current of the first solenoid coil 240, and the controller may determine the locked or unlocked state of the brake based on the output current and/or inductance of the first solenoid coil detected by the detection element. For example, a current measuring device or the like may be appropriately provided in the circuit to serve as the detection element. This will be described in more detail below in conjunction with FIG. 4 to FIG. 7. In addition, it can also judge the wear condition of the friction plate based on the current and/or inductance, etc., and remind people to replace the friction plate. For example, as the friction plate 210 is worn, the moving plate 230 needs to be farther and farther away from the static plate 220 to achieve braking when the moving plate 230 pushes the friction plate 210. In this case, when the increase of the current exceeds a certain threshold and/or the decrease of the inductance exceeds a certain threshold, it is judged that the friction plate is seriously worn and the friction plate needs to be replaced, and a reminder to replace the friction plate is issued.

The example in FIG. 2 is a case where the static plate and the friction plate are spaced apart in an axial direction of an output shaft of the traction machine. Based on the above description, those skilled in the art can understand that after modification, some embodiments of the present disclosure can also be applied to a case where the static plate and the friction plate are spaced apart in a radial direction of the output shaft of the traction machine, such as the traction machine brake as shown in FIG. 1. The brake in FIG. 1 may also include related components such as the moving plate, the static plate, the friction plate, the base, etc., which are not shown, and these components may be arranged in the radial direction.

The base of the brake may be connected to or integrally formed with a base of the traction machine. According to specific needs, in addition to the static plate, the first solenoid coil may also be disposed on another fixed element having a fixed position relative to the base of the brake in different embodiments. For example, the fixed element may be the base of the brake or another element integrally formed on the base. The first solenoid coil may be formed on a bracket or a pillar extending from the fixed element.

In a modified example of the illustrated embodiment, the first solenoid coil may be provided on the moving plate, and the first ferromagnetic body may be provided on the fixed element or the static plate. Similarly, when the moving plate approaches or moves away from the fixed element or the static plate, the change in the current and/or inductance of the first solenoid coil can indicate the state of the brake. At this time, the detection and control circuit has a detection element and a controller. Similarly, the controller can determine the locked or unlocked state of the brake based on the output current of the first solenoid coil detected by the detection element, and can also detect the wear condition of the friction plate.

Figure 3:
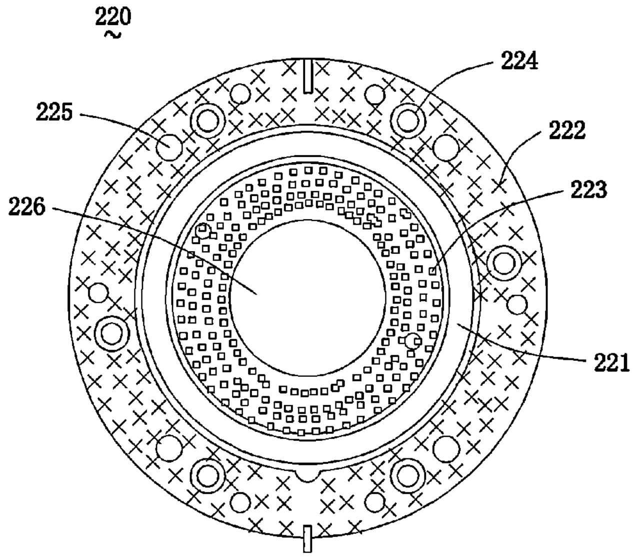
FIG. 3 schematically shows distribution of an electromagnetic field generated by a second solenoid coil of the brake in FIG. 2.

FIG. 3 schematically shows distribution of an electromagnetic field generated by the second solenoid coil of the brake in FIG. 2. In the figure, reference numeral 221 indicates the second solenoid coil of the static plate 220; reference numeral 222 indicates magnetic lines of force in a direction going into the paper; reference numeral 223 indicates magnetic lines of force in a direction coming out of the paper; reference numerals 224 and 225 indicate the positions of other functional elements at the static plate 220, such as but not limited to a guide sleeve, a spring, a washer, a screw, etc.; and reference numeral 226 indicates the position of the encoder disposed at the center of the static plate 220, etc.

As can be seen from this figure, there is no magnetic circuit on the outer circumferential side, or at the center, or at the various functional elements of the static plate 220. Therefore, according to the specific situation, the first solenoid coil may be disposed on the outer peripheral side of the static plate; or the first solenoid coil may be disposed at the center of the static plate; or the first solenoid coil may be embedded in the static plate at a position coinciding with the appropriate functional element or in an expanded space of each functional element.

Based on the brake as shown in FIG. 2, the method for judging its state may include the steps of: inputting a sinusoidal wave voltage into the first solenoid coil; measuring the current and/or inductance of the first solenoid coil; and judging the state of the brake based on a change in the measured current and/or inductance.

Figure 4:
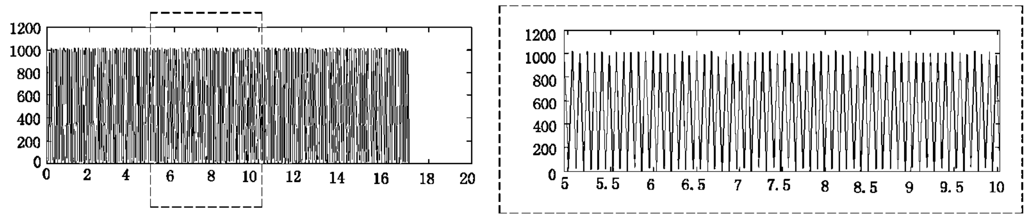
FIG. 4 schematically shows a sinusoidal wave voltage input when measuring the first solenoid coil.
Figure 5:
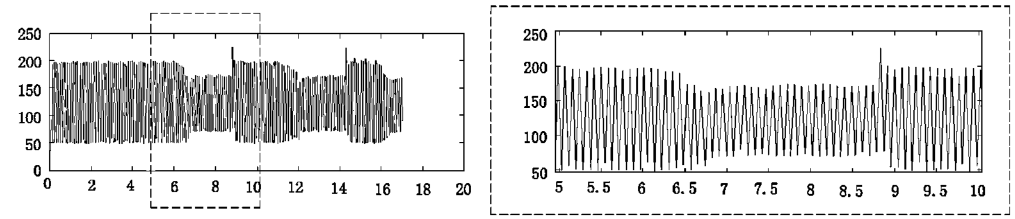
FIG. 5 schematically shows a measured current curve in the first solenoid coil.
Figure 6:
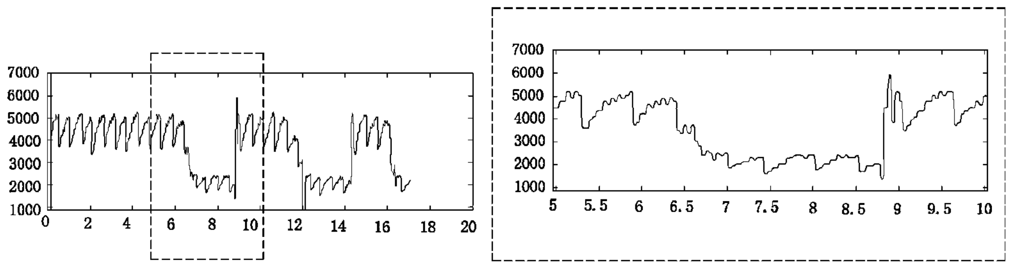
FIG. 6 schematically shows a square curve of the current shown in FIG. 5.
Figure 7:
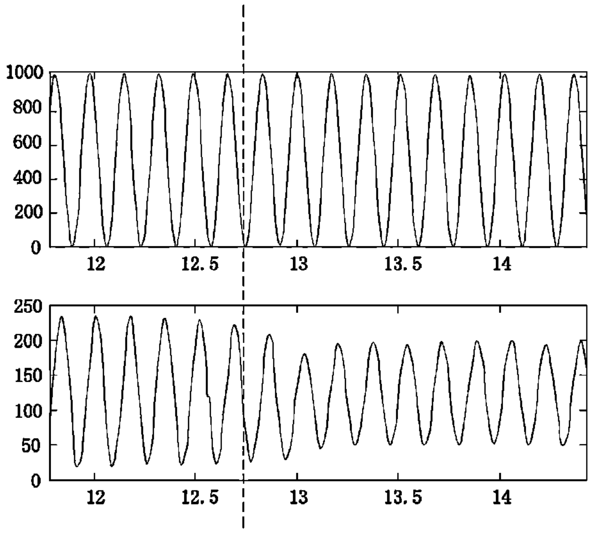
FIG. 7 schematically shows voltage and current curves when the brake is in a locked state and an unlocked state respectively.

FIG. 4 schematically shows a sinusoidal wave voltage input when measuring the first solenoid coil. FIG. 5 schematically shows a measured current curve in the first solenoid coil. FIG. 6 schematically shows a square curve of the current shown in FIG. 5. FIG. 7 schematically shows voltage and current curves when the brake is in a locked state and an unlocked state respectively. In FIGS. 4-7, the ordinate is the amplitude of the corresponding parameter, and the abscissa is the time.

For example, FIG. 4 schematically shows the high-frequency sinusoidal wave voltage input when the first solenoid coil is measured, wherein the right-side figure is a partially magnified interval within the dashed-line box in the left-side figure. The sinusoidal wave voltage has the same amplitude everywhere. FIG. 5 schematically shows the measured current curve in the first solenoid coil, wherein the right-side figure is a partially magnified interval within the dashed-line box in the left-side figure. The amplitude of the current decreases in the dashed-line box interval of the unlocked brake. FIG. 6 schematically shows the square curve of the current shown in FIG. 5, wherein the right-side figure is a partially enlarged interval within the dashed-line box in the left-side figure. The square curve in FIG. 6 shows changes in the current before and after locking the brake and unlocking the brake more clearly than the current curve in FIG. 5, wherein obvious high and low amplitudes can be seen, which correspond to the locked and unlocked states of the brake respectively. FIG. 7 schematically shows voltage and current curves when the brake is in the locked state and the unlocked state respectively, wherein the upper figure is the input sinusoidal wave voltage curve, and the lower figure is the output current curve. In the figure, on the left side of the dashed line is shown the curve when the brake is locked, and on the right side of the dashed line is shown the curve after the brake is unlocked. It can be seen that after unlocking, the amplitude of the current decreases and the phase difference lags behind. Based on the description of FIG. 5 to FIG. 7, it can be understood that the state of the brake can be judged based on the output change of the current. Similarly, when the resistance, angular frequency, frequency and other parameters of the first solenoid coil are known, the value of the inductance can also be calculated based on the input voltage and output current. Therefore, based on the change in the inductance, the state of the brake can also be judged. Similarly, the method of measuring the voltage and/or calculating the inductance by inputting the current can also be used to judge the state of the brake.

Some other aspects of the present disclosure further relate to a traction machine including the brake described in any one of the above embodiments and variants thereof, and an elevator system including such a traction machine. The elevator system may include components such as a car, a counterweight, a traction machine, and a traction rope. The traction machine of the elevator system further includes main components such as a motor, a brake, and an encoder. The brake can be used to lock a shaft or wheel, etc., of the motor when the elevator system needs to be stopped.

In the elevator system, the traction machine brake may include a moving plate, a static plate, a friction plate, etc. The moving plate can reciprocate between the static plate and the friction plate. In order to judge the state of the brake, in many cases, a moving plate position detection device such as a microswitch is provided for the brake. In some aspects of the present disclosure, a first solenoid coil and a first ferromagnetic body are additionally installed for the brake to judge the position of the moving plate based on a change in the electrical property of the first solenoid coil, thereby eliminating the trouble-prone mechanical microswitch, simplifying the mechanical structure, improving the reliability, saving the cost, and having no contact and no wear, while still being capable of achieving the same function efficiently. The first solenoid coil may be provided on one of the moving plate and a fixed element having a fixed position relative to the base of the brake, and the first ferromagnetic body may be provided on the other of the moving plate and the fixed element. With this arrangement, as the moving plate moves, the distance between the first solenoid coil and the first ferromagnetic body changes, thereby causing a change in the current passing through the first solenoid coil or the inductance of the first solenoid coil, and based on the change in the current and/or the inductance, the position of the moving plate can be judged so as to determine the state of the brake.

In addition, in the embodiment in which the first solenoid coil and the first ferromagnetic body are arranged in this way, the wear condition of the friction plate can also be judged based on the current and/or inductance, and people can be reminded to replace the friction plate. For example, as the friction plate wears, the moving plate needs to be farther and farther away from the static plate when the moving plate pushes the friction plate. When the increase of the current exceeds a certain threshold and/or the decrease of the inductance exceeds a certain threshold, it is judged that the friction plate is seriously worn and the friction plate needs to be replaced, and a reminder to replace the friction plate is issued.

The technical scope of the present disclosure is not limited to the content in the above description. Those skilled in the art can make various variations, modifications and combinations to the above embodiments without departing from the technical idea of the present disclosure, and these variations, modifications and combinations should fall within the scope of the present disclosure.

What is claimed is:

1. A method for judging the state of a traction machine brake, wherein the brake comprises:

a moving plate, a fixed element having a fixed position relative to a base of the brake, a first solenoid coil and a first ferromagnetic body, wherein the first solenoid coil is disposed on one of the moving plate and the fixed element, the first ferromagnetic body is disposed on the other of the moving plate and the fixed element, a relative position of the first solenoid coil and the first ferromagnetic body is set such that the inductance of the first solenoid coil can change with the distance between the moving plate and the fixed element, wherein the brake further comprises a detection and control circuit which has a detection element and a controller, and the controller determines a locked or unlocked state of the brake based on an output current and/or inductance of the first solenoid coil detected by the detection element;

wherein the method comprises:

inputting a sinusoidal wave voltage into the first solenoid coil;

measuring a current and/or inductance of the first solenoid coil; and determining the state of the brake based on a change in the measured current and/or inductance.

2. The method according to claim 1, wherein the first solenoid coil is formed on a bracket or a pillar extending from the fixed element.

3. The method according to claim 1, wherein the fixed element is the base of the brake or is integrally formed with the base.

4. The method according to claim 1, wherein the fixed element is a static plate of the brake.

5. The method according to claim 4, wherein the brake further comprises a friction plate for braking the traction machine, the static plate and the friction plate are spaced apart, and the static plate has a second solenoid coil, the moving plate is located between the friction plate and the static plate, wherein when the brake is locked, the moving plate moves toward the friction plate under the action of a resetting force and causes the friction plate to brake the traction machine, and when the brake is unlocked, the moving plate overcomes the resetting force under the action of an electromagnetic force of the second solenoid coil and moves toward the static plate.

6. The method according to claim 5, wherein the position where the first solenoid coil is disposed avoids a magnetic circuit of the second solenoid coil.

7. The method of claim 5 wherein the first solenoid coil does not affect the magnetic circuit of the second solenoid coil and the first solenoid coil does not affect movement of the moving plate attracted by the second solenoid coil through the electromagnetic force.

8. The method according to claim 4, wherein the first solenoid coil is disposed on an outer peripheral side of the static plate; or the first solenoid coil is disposed at the center of the static plate; or the first solenoid coil is embedded in the static plate.

9. The method according to claim 4, wherein the static plate and the friction plate are spaced apart in a radial direction of an output shaft of the traction machine.

10. The method according to claim 4, wherein the static plate and the friction plate are spaced apart in an axial direction of an output shaft of the traction machine.

11. The method according to claim 10, wherein the number and/or position of the first solenoid coil coincides with a functional element at the static plate in an axial direction of the static plate.

12. The method according to claim 11, wherein the functional element is at least one of an encoder, a resetting device that generates the resetting force, a guide sleeve, a washer, and a screw.

13. A method for judging the state of a traction machine brake, wherein the brake comprises:

a moving plate, a fixed element having a fixed position relative to a base of the brake, a first solenoid coil and a first ferromagnetic body, wherein the first solenoid coil is disposed on one of the moving plate and the fixed element, the first ferromagnetic body is disposed on the other of the moving plate and the fixed element, a relative position of the first solenoid coil and the first ferromagnetic body is set such that the inductance of the first solenoid coil can change with the distance between the moving plate and the fixed element;

wherein the brake further comprises a detection and control circuit which has a detection element and a controller, and the controller determines a locked or unlocked state of the brake based on an output inductance of the first solenoid coil detected by the detection element;

wherein the method comprises:

inputting a sinusoidal wave voltage into the first solenoid coil;
measuring an inductance of the first solenoid coil; and
determining the state of the brake based on a change in the measured inductance.

* * * * *